Figure 1:
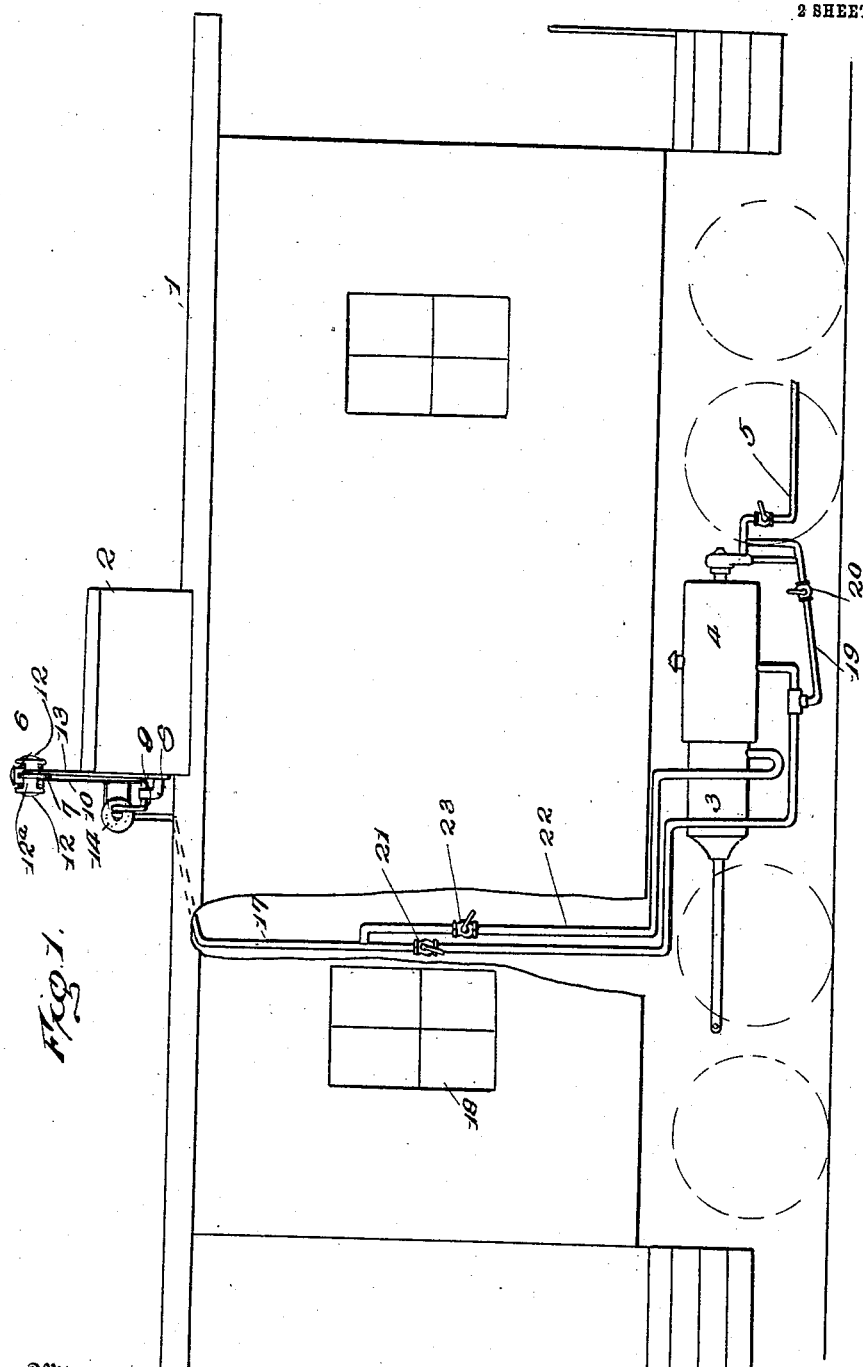

O. R. SNYDER.
AIR BRAKE INDICATOR.
APPLICATION FILED DEC. 23, 1907.

904,568.

Patented Nov. 24, 1908.
2 SHEETS—SHEET 1.

Witnesses

Inventor
O. R. Snyder
By
Attorneys

O. R. SNYDER.
AIR BRAKE INDICATOR.
APPLICATION FILED DEC. 23, 1907.
904,568.
Patented Nov. 24, 1908.
2 SHEETS—SHEET 2.
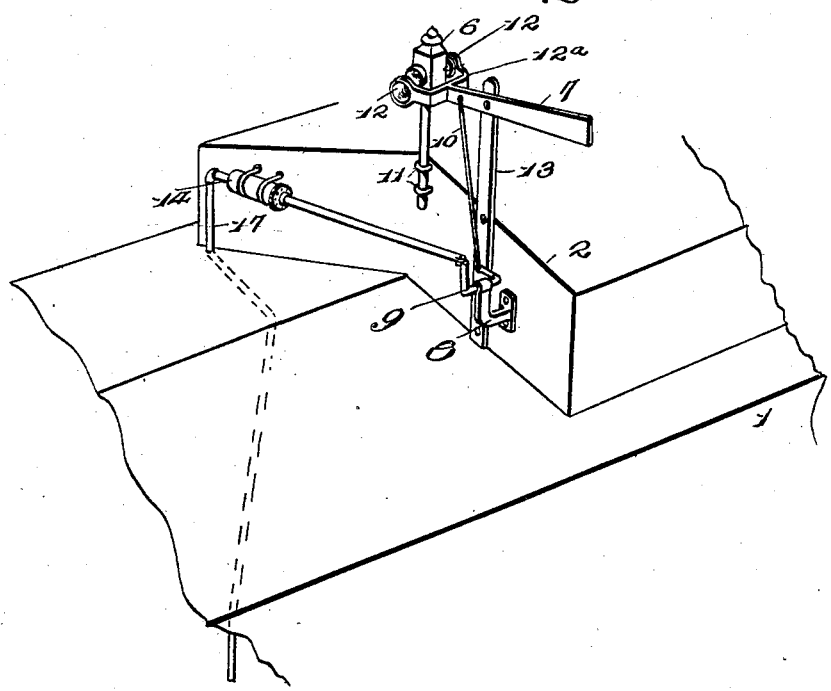
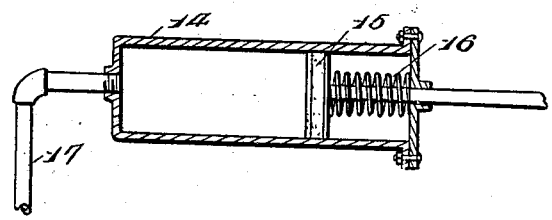
Witnesses
Inventor
O.R. Snyder
By
Attorneys

UNITED STATES PATENT OFFICE.

ODIE R. SNYDER, OF KNOXVILLE, TENNESSEE.

AIR-BRAKE INDICATOR.

No. 904,568.  Specification of Letters Patent.  Patented Nov. 24, 1908.

Application filed December 23, 1907. Serial No. 407,867.

*To all whom it may concern:*

Be it known that I, ODIE R. SNYDER, citizen of the United States, residing at Knoxville, in the county of Knox and State of Tennessee, have invented certain new and useful Improvements in Air-Brake Indicators, of which the following is a specification.

The present invention contemplates an improved car signaling device which when closely watched by the engineer will avert the possibility of those accidents caused by the air brakes being cut out any where between the engine and the last car or caboose.
The object of the invention is to design a novel indicating device adapted to be mounted upon the caboose or last car of a train and connected to the air brake mechanism in such a manner as to operate automatically to signal to the engineer whether or not the train line pipe is charged to the rear of the train.

For a full description of the invention and the merits thereof and also to acquire a knowledge of the details of construction and the means for effecting the result, reference is to be had to the following description and accompanying drawings, in which:

Figure 1 is a side elevation of a car having the improved air brake indicator applied thereto. Fig. 2 is a perspective view of the signal lamp and semaphore. Fig. 3 is an enlarged sectional view through the signal operating cylinder.
Corresponding and like parts are referred to in the following description and indicated in all the views of the drawings by the same reference characters.

The invention is shown as mounted upon a caboose 1 which may be of any conventional construction and in the present instance is formed with a cupola 2. The car 1 is provided with the usual air brake mechanism which is operated by means of the brake cylinder 3, the numeral 4 indicating the auxiliary reservoir which is designed to communicate with the train line pipe 5. The signal device proper is mounted upon the cupola 2 of the caboose and comprises a lamp 6 and a semaphore 7, the former being utilized at night and the latter in the day. The semaphore 7 is mounted upon a standard 13 projecting upwardly from the cupola and is designed to be swung downwardly to an angle of forty-five degrees when the train line is charged to the rear of the train in the proper manner, and to be swung upwardly into a horizontal position when the train line is not charged or is cut out between the engine and caboose. A bracket or bearing member 8 is located adjacent the base of the standard 13 and journaled upon the said bracket is a horizontally disposed rock shaft 9 provided at its opposite ends with crank arms arranged at approximately right angles to each other. One of these crank arms is connected to the semaphore by means of a link 10 for the purpose of actuating the same, while the opposite crank arm has an operative connection with a piston 15 operating within a cylinder 14 mounted upon the cupola. This piston 15 is normally forced to the rear end of the cylinder 14 by means of a spring 16 and when moved into this position turns the rock shaft 9 so as to throw the semaphore into a horizontal position indicating danger. The lamp 6 is mounted adjacent the standard 13 upon a support 11 and is provided at its front and rear portions with the usual openings through which the light is visible. Carried by the pivot end of the semaphore 7 is a pair of red lenses 12 or equivalent members which are designed to cover the before mentioned lamp openings and to cause the lamp to show a red light indicating danger when the semaphore 7 is horizontal. However when the said semaphore drops to an angle of forty-five degrees to the standard 13 and assumes a safety position the red lenses 12 are swung upwardly above the lamp openings and the lamp shows a white light. In the present instance these red lenses 12 are shown as carried by the opposite ends of a transverse arm $12^a$ secured to one end of the semaphore.

Leading from the cylinder 14 is an air pipe 17 which extends downwardly upon the inside of the car adjacent one of the windows 18 of the caboose and communicates with the auxiliary reservoir 4 and also through a branch pipe 19 with the train line 5, the passage of air from the train line through this branch 19 being controlled by a valve 20. It will thus be apparent that when the train line is properly charged to the rear of the train the air pressure will operate against the piston 15 so as to force the same outwardly and compress the spring 16, in which position the lamp shows a white light and the semaphore is moved downwardly to an angle of forty-five degrees. As soon however as the train line is cut out between the engine and the caboose or for any reason the air pressure becomes insufficient to move the piston against the action of the spring 16, the former is forced to the rear end of the cylinder and the signals correspondingly moved to warn the engineer of the fact that the air brakes are not in proper working condition.

It is also contemplated to utilize the indicator as a safety device by the addition of a three-way cock 21 in the pipe 17, the said cock being located adjacent the window 18 so as to be readily operated by a person upon the interior of the caboose. Should it be desired to caution the engineer that the train is approaching a meeting or passing point, the three-way cock 21 is turned to release air from the piston 15, thereby causing the spring 16 to force the piston to the rear end of the cylinder and throw the signal devices into a position indicating danger. As soon however as this signal has been properly answered by the engineer the three-way cock 21 is again turned into its original position and air pressure again admitted to the cylinder 14, as otherwise the engineer would understand the signal to indicate no air and would signal the train crew accordingly.

Owing to the fact that the air pipe 17 has a direct connection with the train line 5 a prompt action or movement of the signal devices is obtained either when the train line is being recharged or when the train line is emptied as when the train has parted or the air has been cut out between the engine and the caboose. The communication of the pipe 17 with the auxiliary reservoir 4 prevents the train brakes from being applied when air is withdrawn for recharging the cylinder after operating the signal device to warn the engineer of a meeting or passing point.

The above described indicator may also be used with the same results by connecting the pipe 17 with the air brake cylinder 3 through the medium of a branch 22, the said branch joining the pipe at a point adjacent the window 18 and being provided with a cut out cock 23 by means of which all direct communication between the pipe 17 and the brake cylinder 3 can be closed when the device is set so as to be operated directly from the train line and auxiliary reservoir. When the indicator is actuated through the medium of air pressure transmitted through the branch pipe 22 from the brake cylinder, the signal is worked in an opposite manner to that previously described, since the air only enters the cylinder 14 when air is let into the brake cylinder for applying the brakes. Should the engineer desire to know whether or not the air is working properly at the rear of the train, it is simply necessary for him to reduce the train line pressure a slight amount, say ten pounds, when the signal will be turned from white to red by the air rushing from the brake cylinder 3 to the signal actuating cylinder 14. It will also be apparent that this same result will be accomplished should the train line be broken or the air cut out anywhere between the engine and caboose. This signaling device as will be apparent from the foregoing description can be operated by a single pipe connection with either the auxiliary reservoir, train line, or brake cylinder, or with a combination of all of these connections.

Having thus described the invention, what is claimed as new is:

1. In an air brake indicator for railway cars, the combination of a signal lamp upon the car, a stand upon the car, a swinging semaphore pivotally mounted upon the standard at an intermediate point, means at one end of the semaphore for coöperation with the lamp to control the light displayed thereby, a cylinder, a pipe leading from the cylinder to the train line, and a piston operating within the cylinder and having an operative connection with the semaphore.

2. In an air brake indicator, the combination of a signal, a cylinder, a piston operating within the cylinder and having an operative connection with the signal, a pipe leading from the cylinder to the train line, and a three-way cock in the length of the pipe.

3. In an air brake indicator, the combination of a signal, a cylinder, a piston operating within the cylinder and having an operative connection with the signal, and a pipe leading from the cylinder and having communication both with the train line and the auxiliary reservoir.

4. In an air brake indicator, the combination of a signal, a cylinder, a piston operating within the cylinder and having an operative connection with the signal, a pipe leading from the cylinder and communicating with both the train line and the auxiliary reservoir, and a valve for controlling the direct flow from the train line to the pipe.

5. In an air brake indicator, the combination of a signal, a cylinder, a piston operating within the cylinder and having an operative connection with the signal, a pipe leading from the cylinder and communicating with both the train line and the auxiliary reservoir, a valve for controlling the direct flow from the train line to the pipe, and a three-way cock in the length of the pipe.

6. In an air brake indicator, the combination of a signal, a signal operating cylinder, a piston operating within the said cylinder and having an operative connection with the signal, a pipe leading from the cylinder and communicating with the train line, and a branch pipe communicating with the brake cylinder.

7. In an air brake indicator, the combination of a signal, a signal operating cylinder, a piston operating within the cylinder and having an operative connection with the signal, a pipe leading from the cylinder and communicating with both the train line pipe and the auxiliary reservoir, and a branch pipe communicating with the said pipe and also with the brake cylinder.

In testimony whereof I affix my signature in presence of two witnesses.

ODIE R. SNYDER. [L. S.]

Witnesses:
L. M. BELEW,
J. J. WINFREY.